US011503016B2

(12) United States Patent
Duro

(10) Patent No.: US 11,503,016 B2
(45) Date of Patent: Nov. 15, 2022

(54) METHOD AND SYSTEM FOR THE AUTHENTICATION OF A CLIENT TERMINAL BY A TARGET SERVER, BY TRIANGULATION VIA AN AUTHENTICATION SERVER

(71) Applicant: ORANGE, Issy-les-Moulineaux (FR)

(72) Inventor: Jean-Marc Duro, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 116 days.

(21) Appl. No.: 16/717,187

(22) Filed: Dec. 17, 2019

(65) Prior Publication Data

US 2020/0195628 A1   Jun. 18, 2020

(30) Foreign Application Priority Data

Dec. 18, 2018  (FR) ...................... 1873245

(51) Int. Cl.
*H04L 9/40*      (2022.01)
(52) U.S. Cl.
CPC ........ *H04L 63/083* (2013.01); *H04L 63/0236* (2013.01); *H04L 63/0876* (2013.01); *H04L 63/20* (2013.01)
(58) Field of Classification Search
CPC .................. H04L 63/083; H04L 63/0236; H04L 63/0876
USPC ........................................................... 726/7
See application file for complete search history.

(56) References Cited

U.S. PATENT DOCUMENTS 7,950,051 B1    5/2011   Spitz et al.

2004/0030932 A1 *  2/2004  Juels ................... H04W 12/126
                                                        713/151
2018/0150631 A1    5/2018  Aguilar-Macias et al.

FOREIGN PATENT DOCUMENTS

CN    108711209 A    10/2018
WO    2013040957 A1   3/2013

OTHER PUBLICATIONS

French Search Report and Written Opinion dated Aug. 23, 2019 for corresponding French Application No. 1873245, filed Dec. 18, 2018.
English translation of the French Written Opinion dated Aug. 23, 2019 for corresponding French Application No. 1873245, filed Dec. 18, 2018.
English machine translation of the Notification under Article 94(3) dated May 20, 2021 for European Application No. 19 211 391.8.

* cited by examiner

*Primary Examiner* — Anthony D Brown
(74) *Attorney, Agent, or Firm* — David D. Brush; Westman, Champlin & Koehler, P.A.

(57) ABSTRACT

A method for authenticating a client terminal by a target server. The method includes: the client terminal authenticates itself with an authentication server; the target server authenticates itself with the authentication server; the authentication server and the target server share a password for the client terminal; the authentication server transmits the password to the client terminal; the client terminal transmits the password to the target server; and the target server determines whether or not there is a correspondence between the password shared with the authentication server and the password transmitted by the client terminal, and if the correspondence between passwords exists, the client terminal is authenticated by the target server.

20 Claims, 13 Drawing Sheets

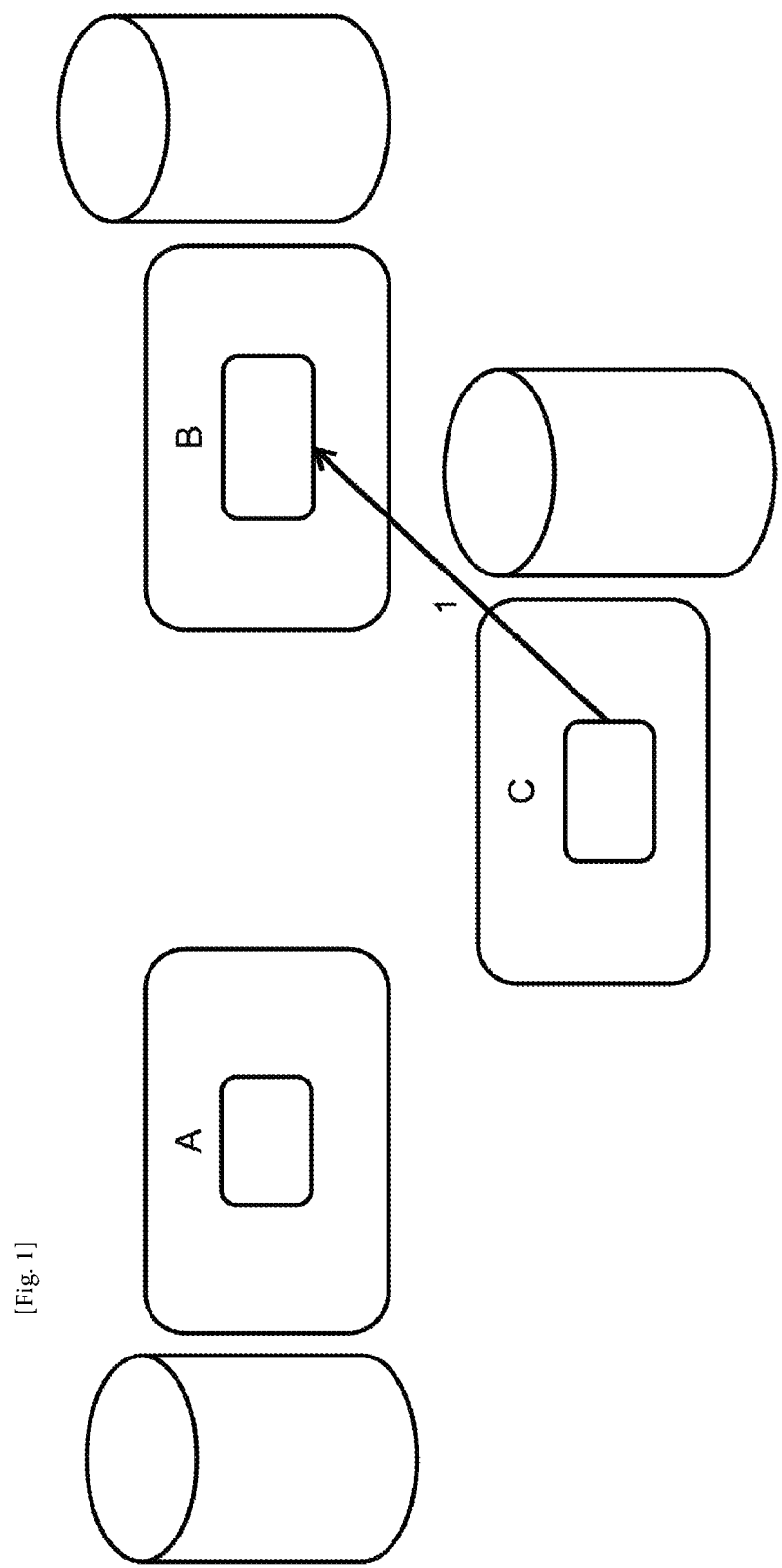

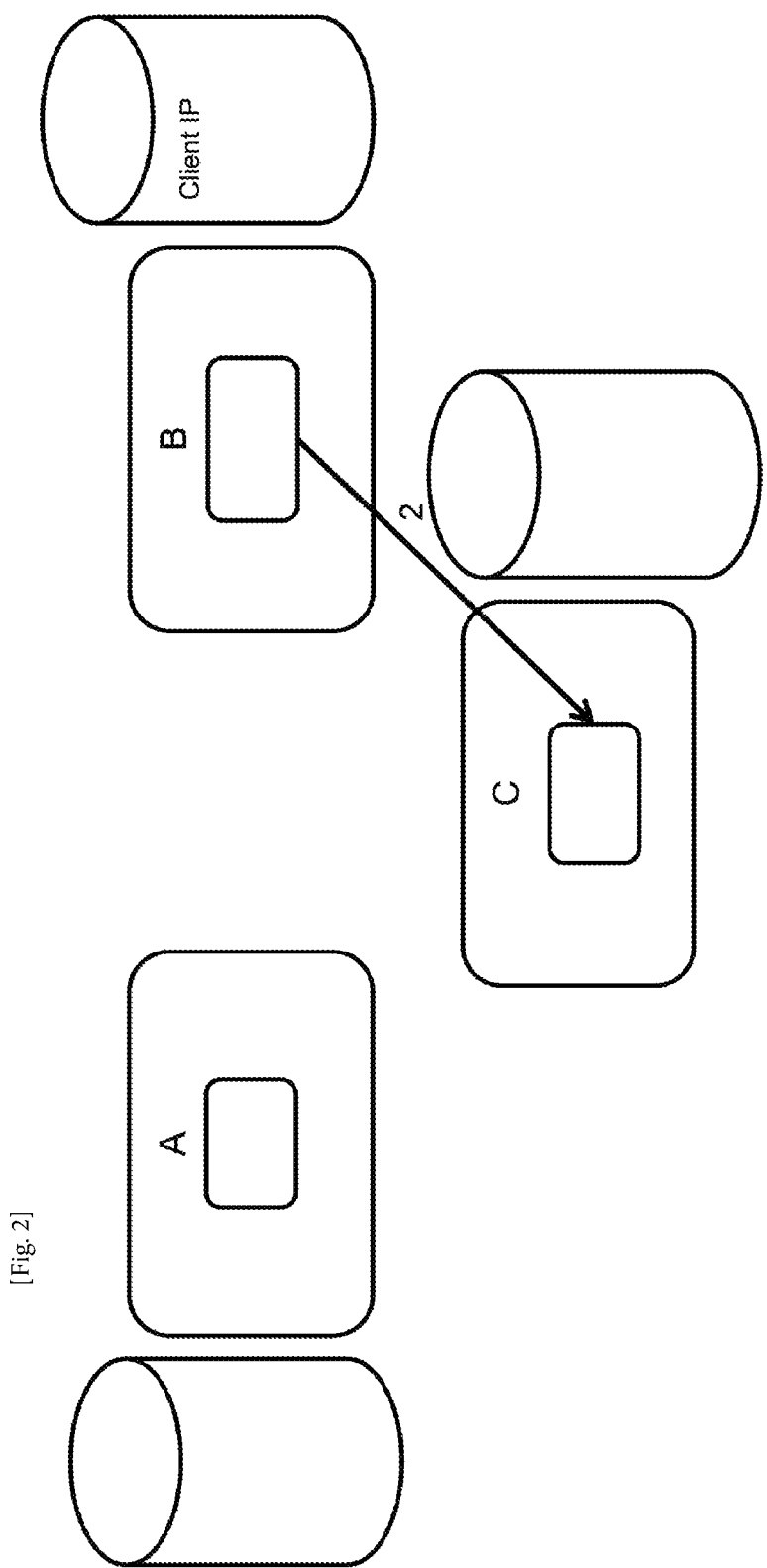
[Fig. 2]

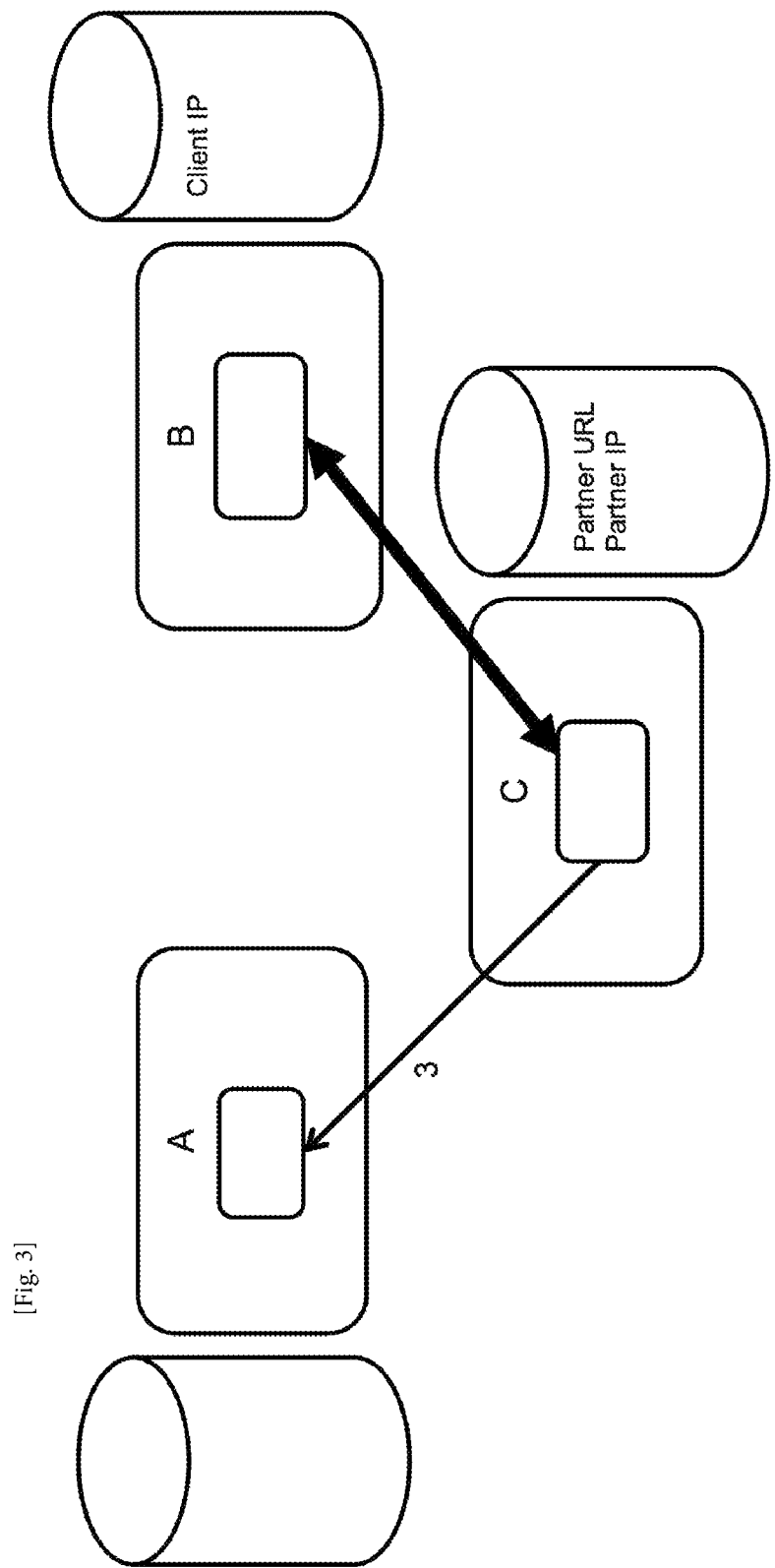
[Fig. 3]

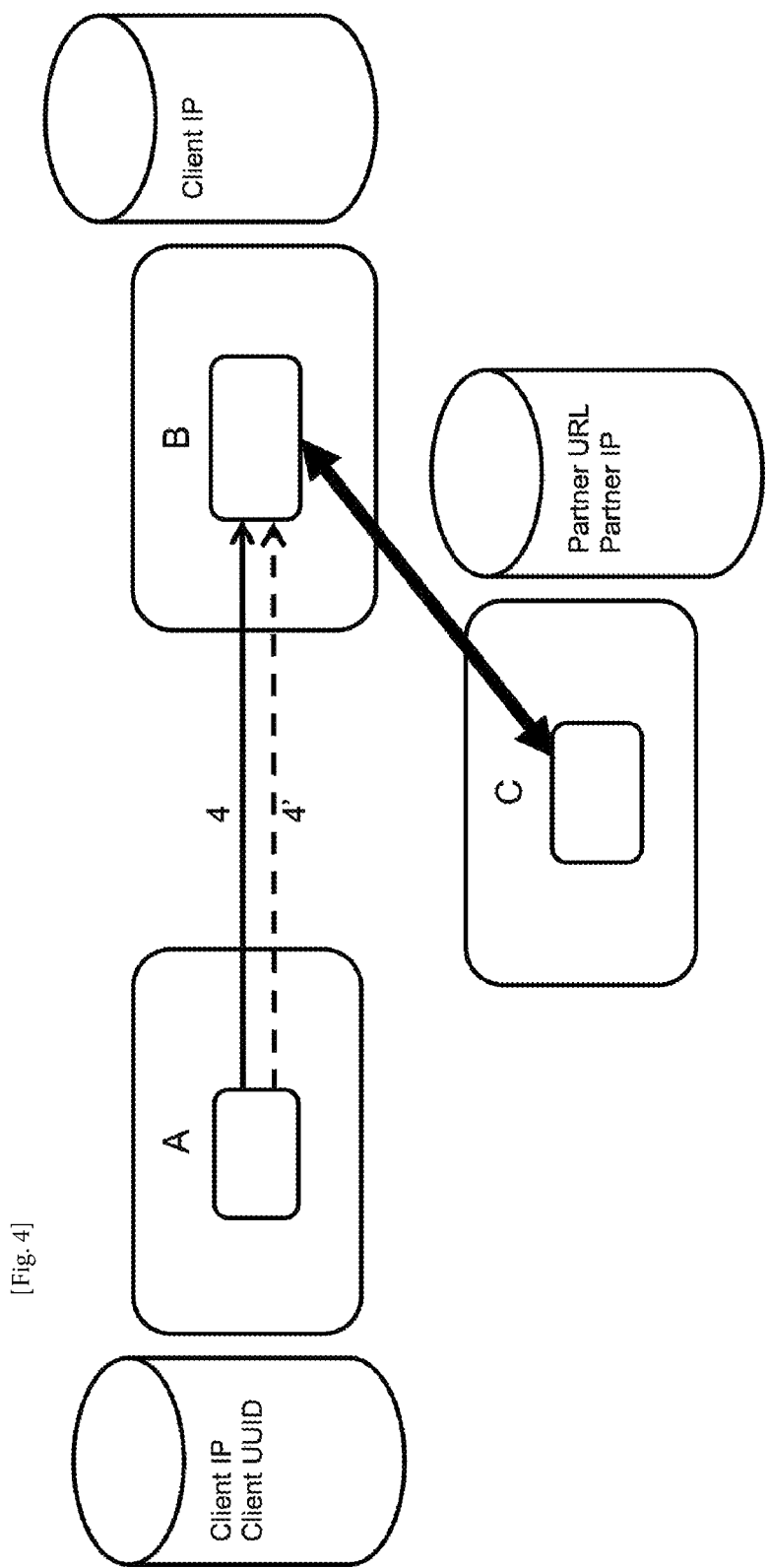
[Fig. 4]

[Fig. 5]
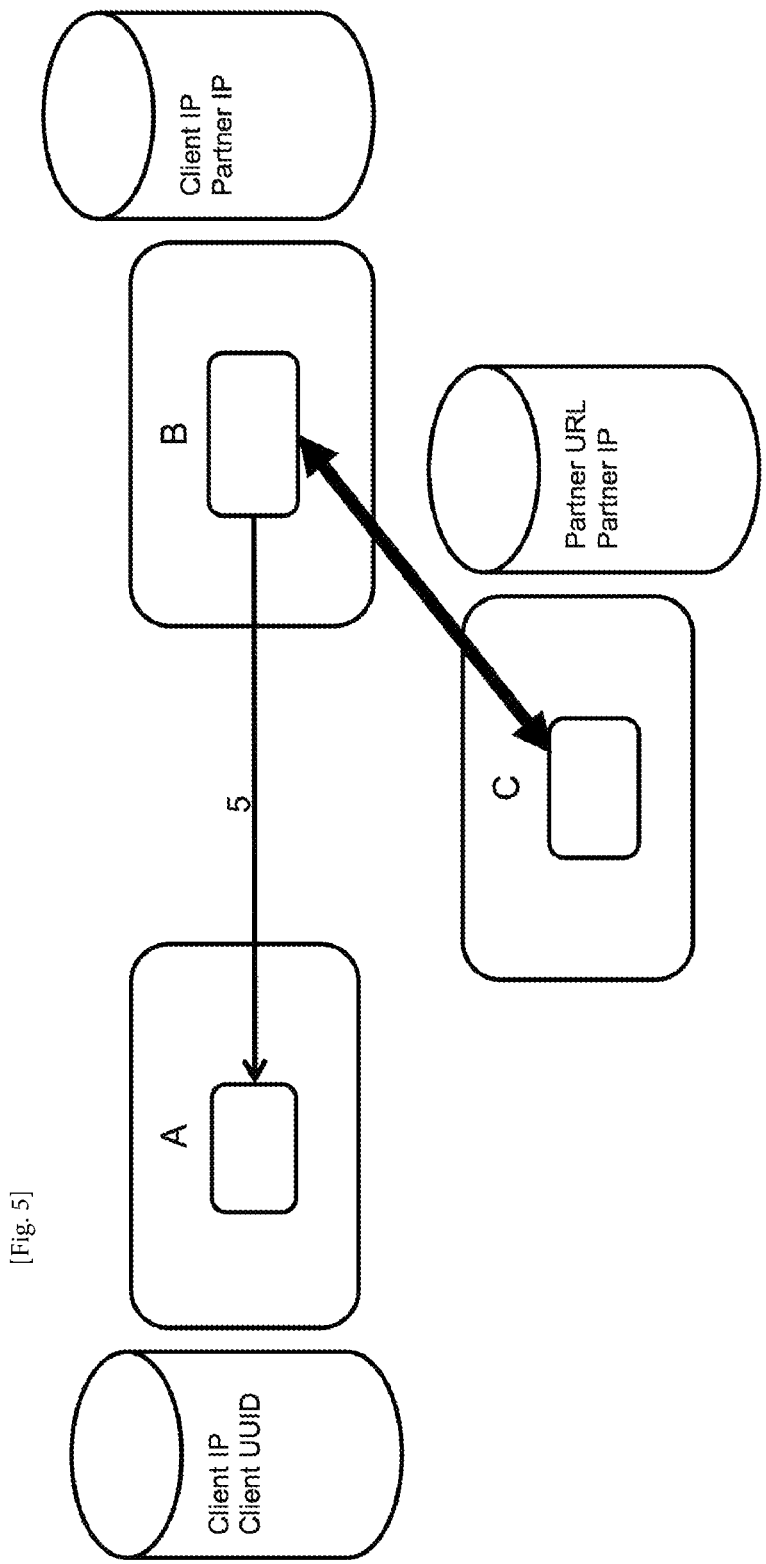

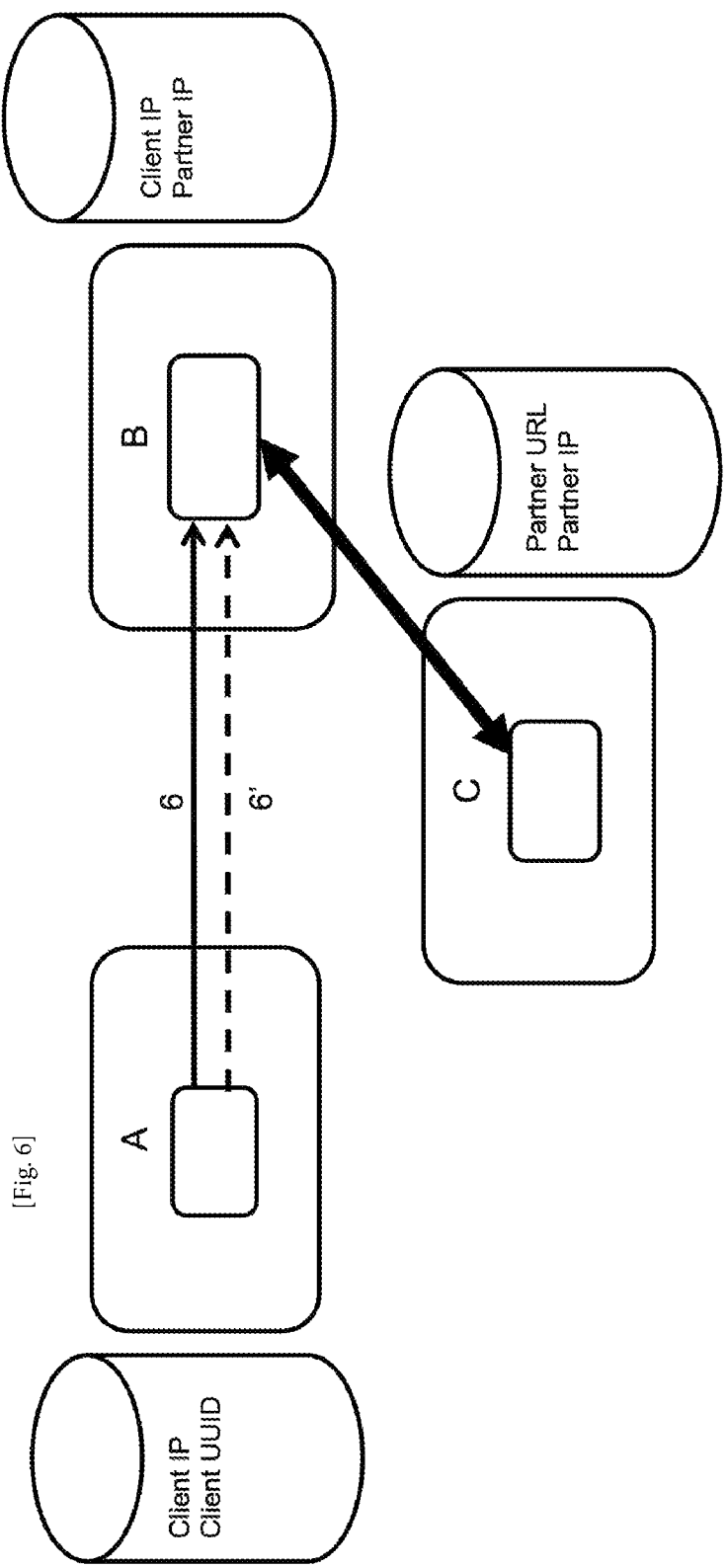
[Fig. 6]

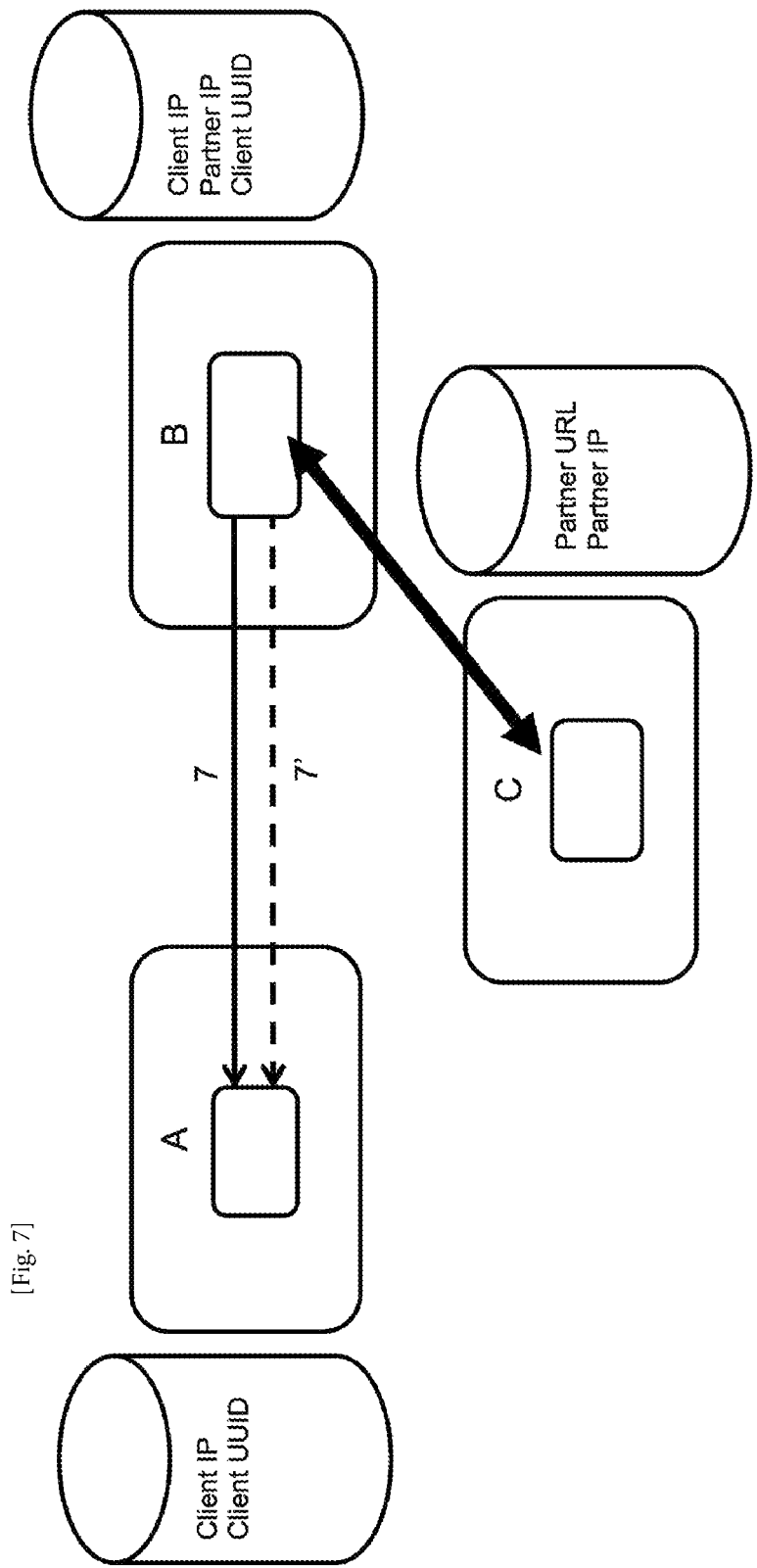

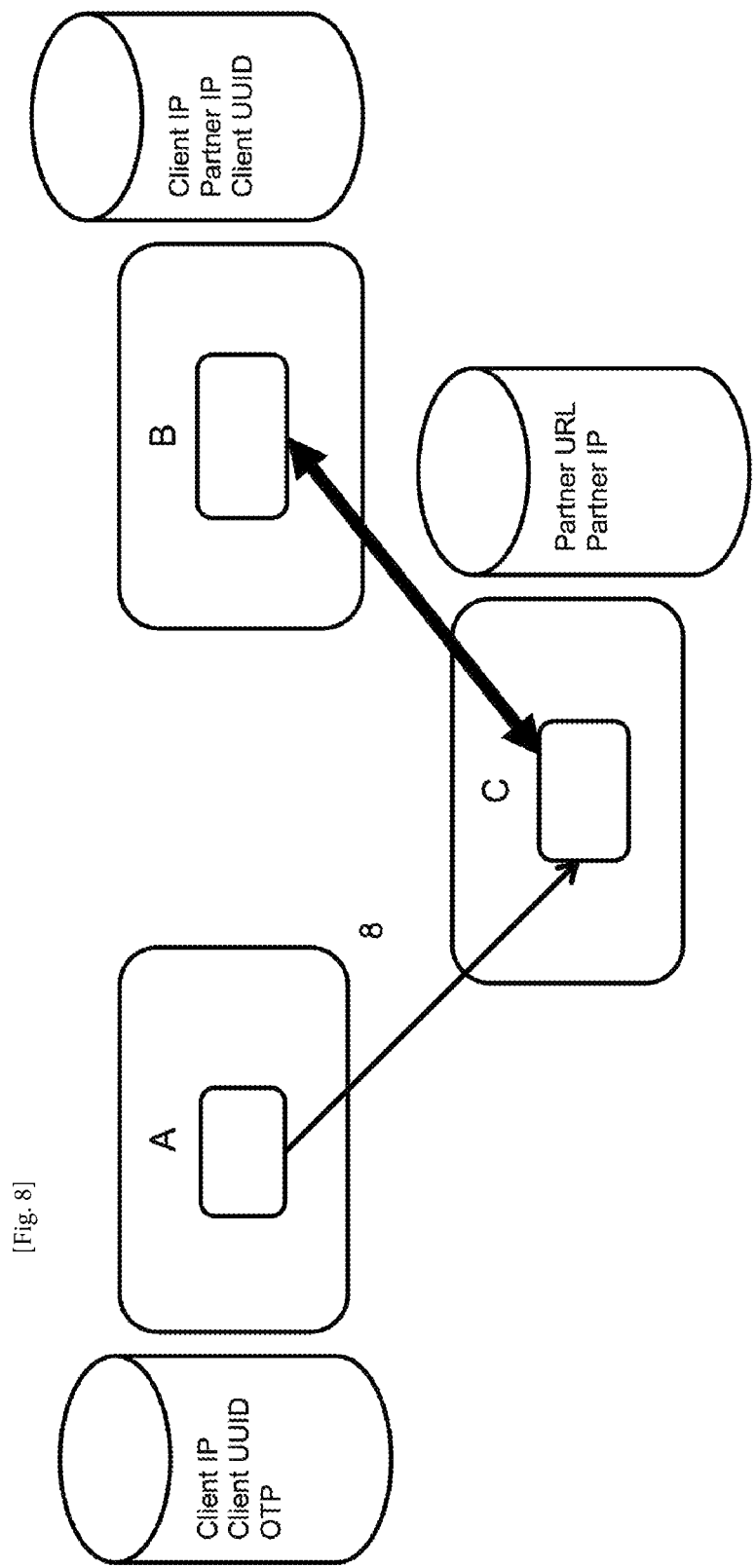
[Fig. 8]

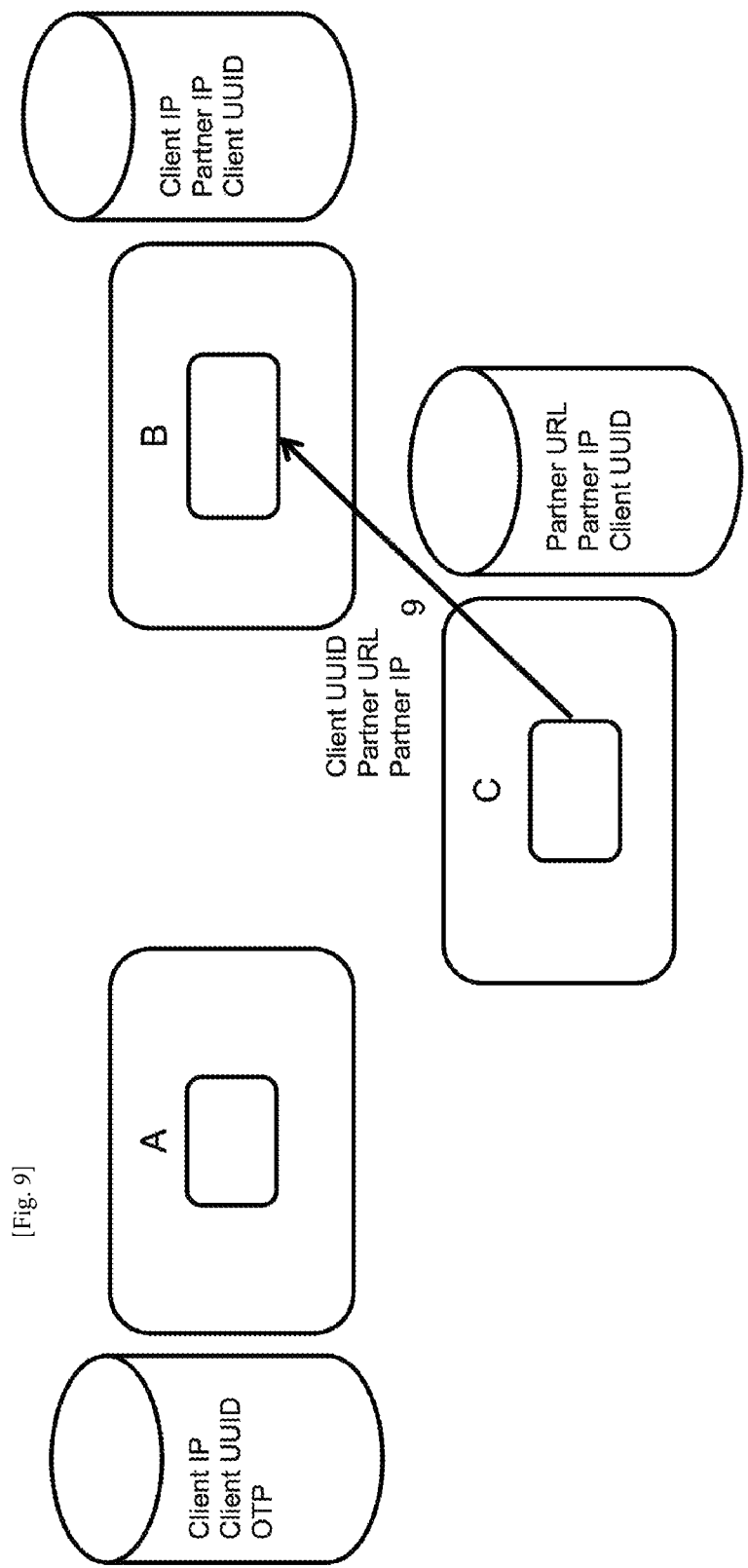
[Fig. 9]

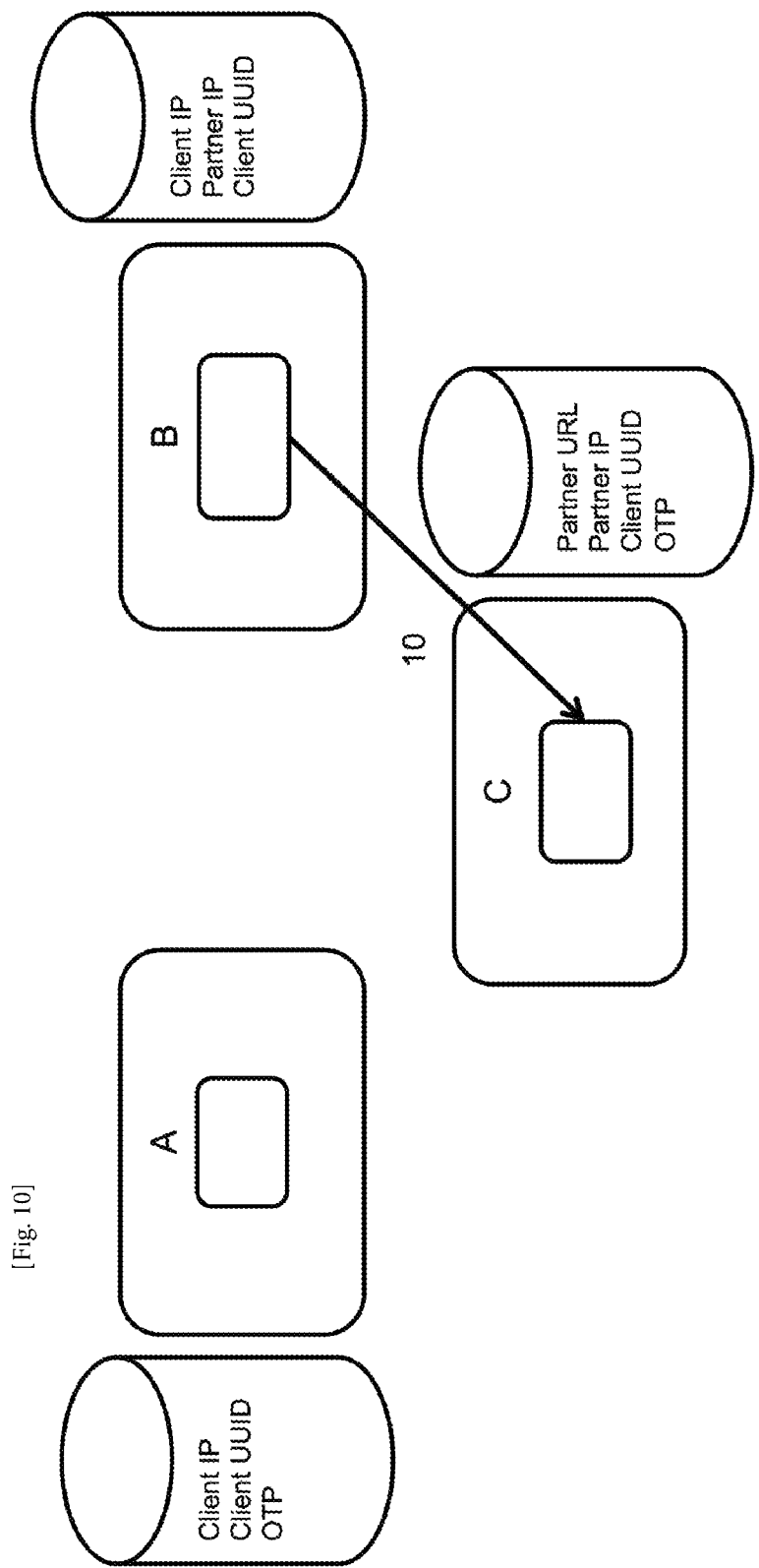
[Fig. 10]

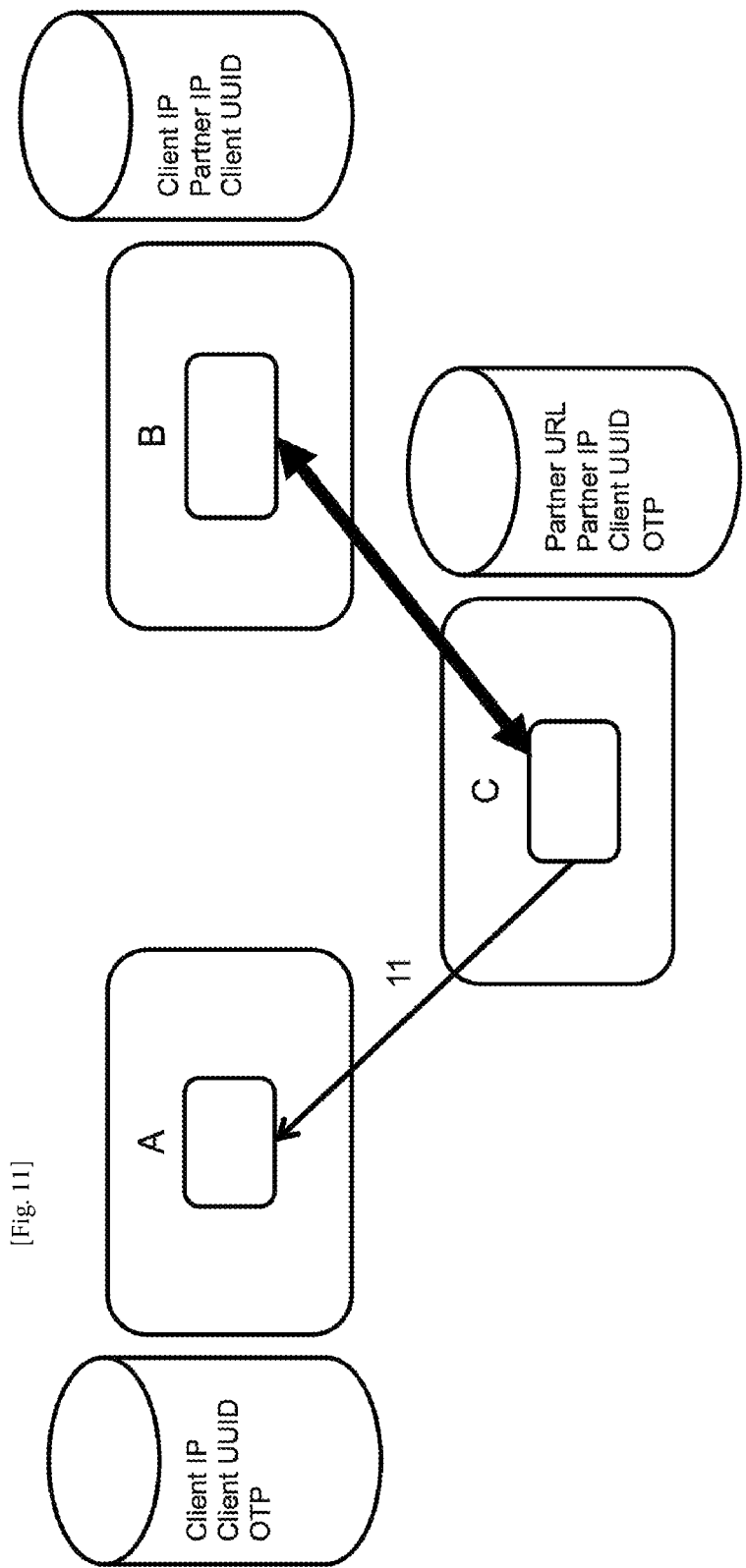
[Fig. 11]

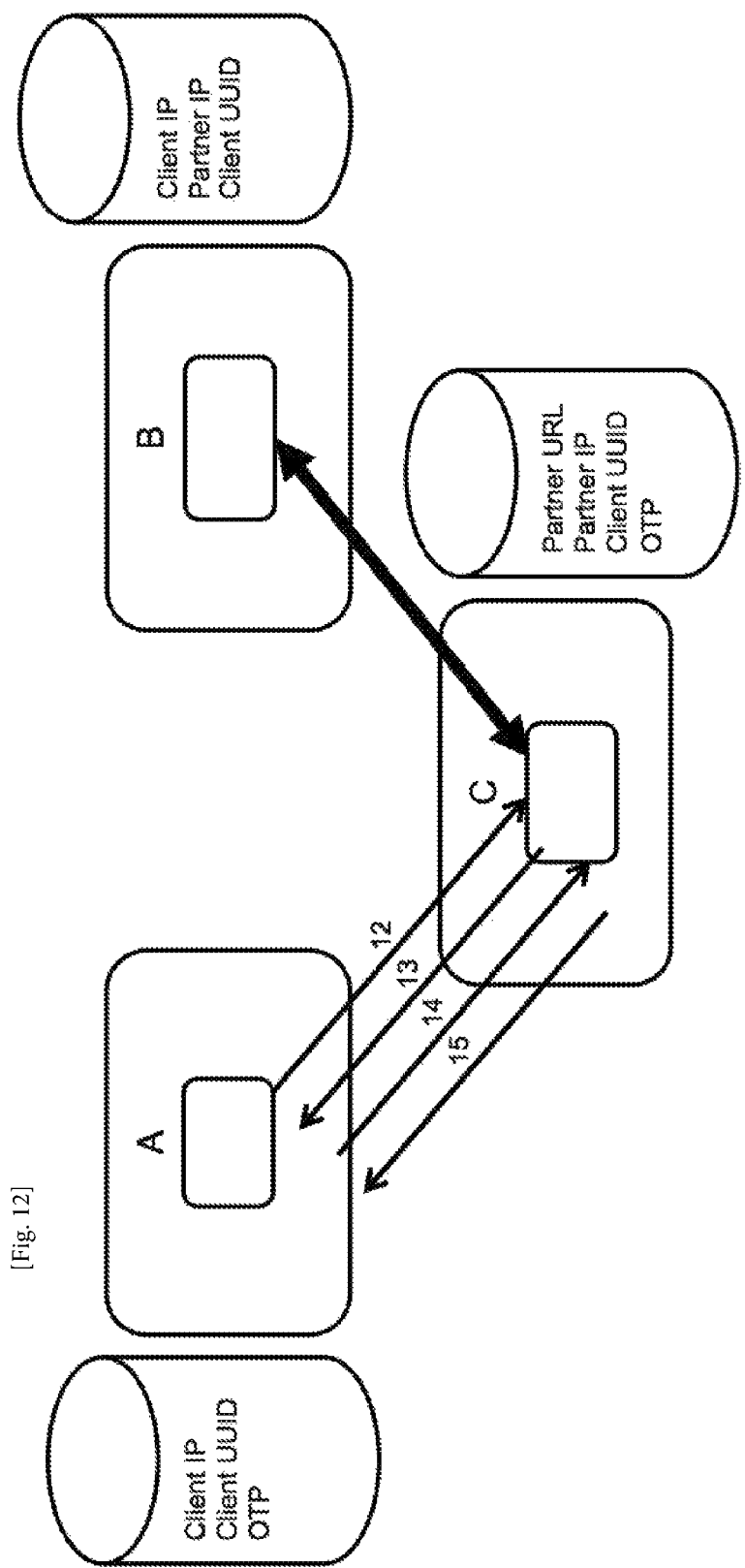
[Fig. 12]

[Fig. 13]
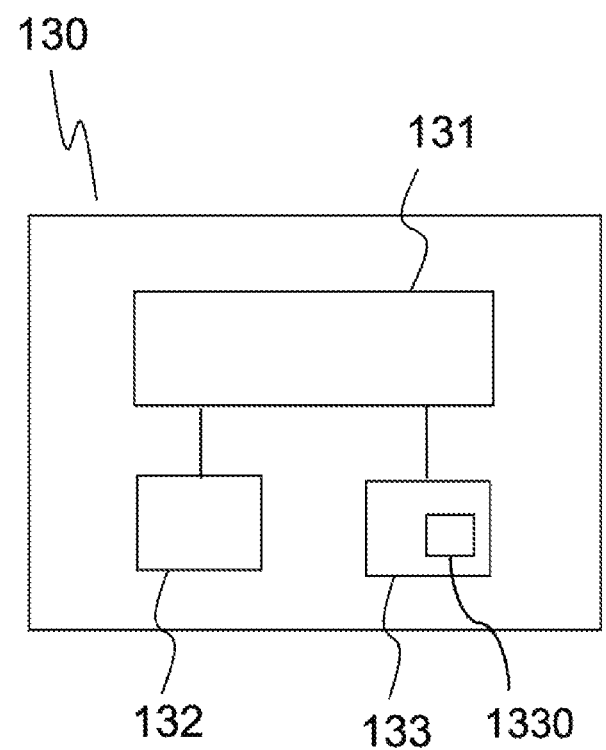

METHOD AND SYSTEM FOR THE AUTHENTICATION OF A CLIENT TERMINAL BY A TARGET SERVER, BY TRIANGULATION VIA AN AUTHENTICATION SERVER

1. TECHNICAL FIELD

The field of the invention is that of the management of passwords in the framework of authentication processes.

More specifically, the invention relates to a process (a method and a system) of authentication of a client terminal (also called a "client") by a target server (also called a "resource server", "applications server" or again "service server"), so that a secure connection can be set between these two entities. Thus, after it has been authenticated by the target server, the client terminal will be able, via the secure connection, to access a resource hosted by the target server.

The term "client terminal" is understood to mean any type of device (computer, tablet, smartphone, etc.) that can be used by a user to access resources (websites, contents, services, functions, software, applications, etc.) via a secure connection (for example according to the HTTPS (hypertext transfer protocol secure) protocol, the SSL/TLS (secure sockets layer/transport layer security) protocol, etc.). To this end, the client terminal executes for example an Internet browser or a "download client" type of software.

The term "target server" is understood to mean any type of device (server, computer, connected thing, etc.) capable of hosting resources and providing them to another entity (a client terminal) after the latter entity has been authenticated.

2. TECHNOLOGICAL BACKGROUND

In an increasingly connected world, there are ever greater numbers of websites, services, software and applications each requiring authentication of the user (in general through the furnishing of an identifier (login)/password pair by the user) in order to access contents or functions. Now, the fact of having to memorize dozens of "identifier (login)/password pairs" has become a real constraint for users.

The management of passwords, which is already very complicated both for users and for designers of target servers in the sense mentioned here above (especially for industrialists who are providers of connected things and website editors), is getting increasingly complicated from day to day with the surge in the number of connected things.

There is therefore a problem for users who have difficulty in the secure management of large numbers of passwords.

The single-sign-on system is one known solution to this problem. This is a method enabling a user to access several target servers (for example IT application servers or secure websites) by carrying out only one authentication. Any constraint of repeated authentication is thus eliminated. Whatever the standard used for the single-sign-on authentication (Open ID Connect, Facebook Connect, SAML, Microsoft Account (formerly called Passport), etc.), the secure infrastructure brings an authentication server into play between the client and the target server.

As is described in detail in the URL page "https://auth0.com/blog/what-is-and-how-does-single-sign-on-work/", single-sign-on authentication relies on a session shared among several domains and on signed authentication tokens (often in the form of cookies) that contain the information needed for the connection. More specifically, the user enters his identifier or login and his password in order to obtain the token that enables him to then access specific resources without re-using his user name and his password. Once the user has obtained his token, it offers access to specific resources for a precise period of time on one or more remote sites. In other words, the token enables the addition of an indirect level of authentication instead of having to get connected with the identifier (login) and the password for each protected resource. In this way, the user authenticates himself only once (in a session of limited duration), obtains a token in return for a limited duration and uses this token for an additional authentication during his session.

Unfortunately, industrialists providing connected things and the website editors cannot all afford the price of joining a single-sign-on system (SSO). Indeed, the digital signing of the authentication tokens has a non-negligible cost.

In addition to the solution of single-sign-on authentication, hardware solutions, often biometric solutions, are beginning to appear. However, they have the drawback of being dependent on one type of terminal, even when they are external solutions (for example using a USB port).

3. SUMMARY

One particular embodiment of the invention proposes a method of authentication of a client terminal by a target server, the method comprising the following steps:

the client terminal authenticates itself with an authentication server;
the target server authenticates itself with the authentication server;
the authentication server and the target server share a password for the client terminal;
the authentication server transmits the password to the client terminal;
the client terminal transmits the password to the target server; and
the target server determines whether or not there is a correspondence between the password shared with the authentication server and the password transmitted by the client terminal, and if said correspondence between the passwords exists, the client terminal is authenticated by the target server.

Thus, the proposed solution proposes an entirely novel and inventive approach in which a form of authentication is defined by a delegation of service relying on the authentication of a client terminal with a target server by triangulation. We consider a triangle, the vertices C, A and B of which are respectively the client terminal, the target server and an authentication server. The principle is as follows: if the sides A-B and C-B of the triangle are secure links (HTTPS, SSL, etc.) (i.e. if A and C are each authenticated with B), and if an exchange of unique identification information guarantees to A that C is perfectly identified with B (as A itself is identified), then C is deemed to be authenticated with A (and A can therefore accept a secure connection from C) if the authentication of C is given by B. In other words, A delegates its authentication of C to B.

The invention has the same purpose as a single-sign-on (SSO) system, namely it enables the user to authenticate itself only once in order to login to different domains. Indeed, in the proposed solution, to authenticate itself with several target servers, the client terminal authenticates itself only once with the authentication server, and each of the target servers authenticates itself with the authentication server. Thus, each of the target servers delegates its authentication of the client terminal to the authentication server.

However, the comparison stops there: the invention uses distinct sessions (there is no session common to several domains) and there is no signed authentication token. The authentication mechanism on each domain (i.e. with each target server) remains standard. Only the management of the passwords is delegated to the authentication server. The passwords are transmitted on secure (encrypted) links.

One advantage of the proposed solution is that its cost of implementation is smaller because there is no cost of affiliation with a single-sign-on (SSO) authentication system. It is therefore particularly suited to small-sized websites, for residential or again for intra-company purposes.

Another advantage is that since only the management of the passwords is delegated to an authentication server, this server does not need to know the identifier (login) used by the user to identify itself with the target server.

Yet another advantage is that since the architecture of the proposed solution is simple, it is adapted to any use in which the authentication server is embedded (for example as described in detail further below on a home gateway also called "an Internet box").

In one particular implementation described in detail further below, the pieces of unique identification information exchanged among the client terminal, the target server and the authentication server can be a combination of personal identification data (family name, forename, email address, telephone, etc.), identification of the communicating hardware used for the connection (IP address, MAC address, serial number, etc.) and universal unique or universally unique identifiers (UUIDs) generated for the session. Each entity (vertex of the triangle) places the information transmitted by the other two entities (the other vertices of the triangle) with which it in a relationship in correlation.

In other words, the correlation of the client's data with the target server and with the authentication server is permitted by the exchange of permanent data related to him (also called personal identification data further above) and his identification is ensured by an exchange of volatile data (also called further above "communicating hardware identification data" and "one-time codes") between the three components of the triangulation, namely the client, the target server and the authentication server.

In a first implementation, the method furthermore comprises the following steps:
  the target server asks the authentication server for said password, for the client terminal; and
  the authentication server generates said password.

In this first implementation, the target server is easier to implement because it does not have to manage the generation of the password (which is done by the authentication server).

According to one particular characteristic of the first implementation, the step in which the target server asks for said password from the authentication server comes after the following step: the client terminal identifies itself with the target server without authenticating itself.

Thus, the solution is compatible with a client/server type operation in which nothing is at the initiative of the server which only responds to the client's request. Indeed, it is the client's terminal that triggers the exchanges between the target server and the authentication server, and the exchanges can therefore be automated.

In a second implementation, the method comprises the following steps:
  the target server generates said password for the client terminal; and
  the target server transmits said password to the authentication server.

In this second implementation, the authentication server is simpler to implement because it does not have to manage the generation of the password (this is done by the target server).

According to one particular characteristic, the step in which the authentication server transmits the password to the client terminal comes after the following step: the client terminal asks the authentication server for said password.

Thus, the solution is compatible with a client/server type of functioning since the authentication server acts only at the request of the client terminal.

According to one particular characteristic, the method comprises the following steps:
  the target server generates a universal unique identifier for the client terminal and transmits it to the authentication server;
  the authentication server transmits said universal unique identifier to the client terminal;
  the client terminal sends a request to the authentication server to obtain said password, said request containing said universal unique identifier;
  the authentication server verifies whether or not there is a correspondence between the universal unique identifier transmitted by the client terminal and the universal unique identifier transmitted by the target server;
and the step of transmission of the password from the authentication server to the client terminal is not executed if the correspondence between universal unique identifiers does not exist.

In this way, the invention prevents an attack by an unauthorized fourth entity, other than the client terminal (C), the target server (A) and the authentication server (B) (the "man in the middle" type of attack).

According to one particular characteristic, the method comprises the following steps:
  the authentication server retrieves and registers the IP address of the client terminal;
  the target server retrieves and registers the IP address of the client terminal;
  the target server sends the IP address of the client terminal to the authentication server;
  the authentication server compares the IP address of the client terminal coming from the target server and the pre-registered IP address of the client terminal, and verifies whether or not there is a correspondence;
and the step of transmission of the password from the authentication server to the target server is not executed if said correspondence between the IP addresses of the client terminal does not exist.

In this way, the authentication server guarantees to the target server that the client terminal with which it wishes to authenticate itself is truly registered with the authentication server.

According to one particular characteristic, the method comprises the following steps:
  the authentication server retrieves and registers at least one piece of information for identification of the target server;
  the client terminal retrieves and registers said at least one piece of information for identification of the target server;
  the client terminal sends a request to the authentication server to obtain said password, said request containing said at least one piece of information for identification of the target server;

the authentication server verifies whether or not there is a correspondence between said at least one piece of information for identification of the target server transmitted by the client terminal and said at least one piece of pre-registered information for identification of the target server;

and the step of transmission of the password from the authentication server to the client terminal is not executed if said correspondence between pieces of information for identification of the target server does not exist.

In this way, the authentication server guarantees to the client terminal that the target server with which it wishes to authenticate itself is truly registered with the authentication server.

According to one particular characteristic, said at least one piece of information for identification of the target server belongs to the group comprising an IP address of the target server and a URL address of the target server.

According to one particular characteristic, the method comprises the following steps:

the target server obtains at least one piece of information for identification of at least one user of said client terminal;

the target server sends a request to the authentication server to obtain said password, said request containing said at least one piece of identification information;

the authentication server verifies, as a function of said at least one piece of identification information transmitted by the target server, whether or not the client terminal is registered with the authentication server;

and a step of transmission of the password from the authentication server to the target server is not executed if the client terminal is not registered with the authentication server.

In this way, the authentication server guarantees to the target server that the user of the client terminal who wishes to authenticate itself with it is truly registered with the authentication server.

According to one particular characteristic, said password is a one-time password and has a predetermined duration of validity.

The use of a one-time password (OTP) with a predetermined duration of validity averts a situation where an unauthorized entity subsequently reutilizes the password to authenticate itself with the same target server.

In another embodiment of the invention, a computer program product is proposed comprising program code instructions for the implementation of the above-mentioned method (in any one of its different embodiments) when said program is executed on a computer.

In another embodiment of the invention, there is proposed a computer-readable and non-transient storage medium, comprising a set of instructions executable by a computer to implement above-mentioned method (in any one of its different embodiments).

In another embodiment of the invention, a system is proposed for authenticating a client terminal by a target server, characterized in that:

the client terminal comprises means to authenticate itself with an authentication server;

the target server comprises means to authenticate itself with the authentication server;

the authentication server and the target server comprise means to share a password for the client terminal;

the authentication server comprises means to transmit the password to the client terminal;

the client terminal comprises means to transmit the password to the target server; and the target server comprises means to determine whether or not there is a correspondence between the password shared with the authentication server and the password transmitted by the client terminal, the client terminal being authenticated by the target server if said correspondence between passwords exists.

Advantageously, the three main entities of the authentication system (client terminal, target server and authentication server) comprise means to implement steps of the authentication method as described here above, in any one of its different embodiments.

4. LIST OF FIGURES

Other features and advantages of the invention shall appear from the following description, given by way of an indicative and non-exhaustive example and from the appended drawings, of which:

FIG. 1 illustrates a first step of a method of authentication according to one embodiment of the invention;

FIG. 2 illustrates a second step of a method of authentication according to one embodiment of the invention;

FIG. 3 illustrates a third step of a method of authentication according to one embodiment of the invention;

FIG. 4 illustrates a fourth step of a method of authentication according to one embodiment of the invention;

FIG. 5 illustrates a fifth step of a method of authentication according to one embodiment of the invention;

FIG. 6 illustrates a sixth step of a method of authentication according to one embodiment of the invention;

FIG. 7 illustrates a seventh step of a method of authentication according to one embodiment of the invention;

FIG. 8 illustrates an eighth step of a method of authentication according to one embodiment of the invention;

FIG. 9 illustrates a ninth step of a method of authentication according to one embodiment of the invention;

FIG. 10 illustrates a tenth step of a method of authentication according to one embodiment of the invention;

FIG. 11 illustrates an eleventh step of a method of authentication according to one embodiment of the invention;

FIG. 12 illustrates twelfth, thirteenth, fourteenth and fifteenth steps of a method of authentication according to one embodiment of the invention; and FIG. 13 presents an example of a structure to implement each of the three entities (client terminal, target server and authentication server) involved in the method of authentication of FIGS. 1 to 12.

5. DETAILED DESCRIPTION

In all the figures of the present document, the identical elements and steps are designated by a same numerical reference.

Referring now to FIGS. 1 to 12, we present the different steps of a method of authentication according to one embodiment of the invention.

As mentioned further above, it is a method of authentication of a client terminal (referenced C) by a target server (referenced A), through triangulation via an authentication server (referenced B). These different entities have already been defined further above.

In each of the FIGS. 1 to 12, each of the three entities involved (client terminal C, target server A and authentication server B) is associated with a database logo indicating the various pieces of information registered by this entity as the method progresses. Here below in the description, the following pieces of information are described in detail: "Client IP", "Partner URL", "Partner IP", "Client UUID" and "OTP".

In a first step (symbolized by the arrow referenced 1 in FIG. 1), the client terminal C authenticates itself with the authentication server B with a view to setting up a secure connection (HTTPS secured link, SSL, etc.) between them. More specifically, a user of the client terminal C provides an identifier (denoted as "login1") and a password in order to access an authentication service provided by the authentication server B. If necessary, in order to increase the level of this authentication, the client terminal C will provide one or more complementary authentication elements, such as for example an RSA key. With the proposed solution, this authentication of the client terminal C with the authentication server B is the only time when the user needs to authenticate itself.

In a second step (symbolized by the arrow referenced 2 in FIG. 2), the authentication server B verifies whether or not the user is registered for the authentication server, i.e. whether or not the login/password pair provided corresponds to an identical pre-registered pair (for example pre-registered during a phase of registration of the user with this authentication server). If the verification is positive, the authentication server B sends back a status of connection to the client terminal C and registers the IP address of the client terminal C (denoted as "Client IP") (given by the IP protocol in the context of the connection between the authentication server B and the client terminal C). In the event of a negative verification, the present method of authentication by triangulation is stopped.

In a third step (symbolized by the arrow referenced 3 in FIG. 3), the client terminal C is connected to the target server A with an identifier (denoted as "login 2" different from the identifier "login 1" used to authenticate itself with the authentication server B), but without any password (i.e. without an authentication element). To this end, the client terminal C knows and uses the URL address (denoted as "Partner URL") of the connection page dedicated to the target server A. The client terminal C registers the IP address of the target server A (denoted as "Partner IP"), given by the IP protocol within the framework of the connection between the client terminal C and the target server A.

In a fourth step (symbolized by the arrow referenced 4 in FIG. 4), the target server A verifies whether or not the client terminal C is registered in its client database. In the event of positive verification (i.e. if the client terminal is in fact registered), the target server A carries out the following steps (before the passage to the fifth step of the method):
  it registers the IP address of the client terminal C ("IP Client") given by the IP protocol within the framework of the connection between the client terminal C and the target server A;
  it generates and registers a universal unique identifier for the client terminal C (denoted as "Client UUID"); and
  it authenticates itself with the authentication server B with a view to setting up a secure connection between them (HTTPS secured link, SSL, etc.). To this end, the target server A can provide any type of inter-machine authentication element such as for example an RSA key.

In the event of a negative verification, the present method of authentication by triangulation stops. The target server A sends back to the terminal C either a page asking for the creation of an account (in order to go to a classic method of authentication with the entry of a login and a password) or an error page depending on the implementation chosen by the editor of the target server A.

In a fifth step (symbolized by the arrow referenced 5 in FIG. 5), the authentication server B verifies that the target server A is registered for the authentication service. The target server B sends back a connection status to the target server A. If the authentication and the connection are successful, the authentication server B registers the IP address of the target server A (Partner IP) given by the IP protocol within the framework of the connection between the target server A and the authentication server B. If not, the present method of authentication by triangulation stops.

In a sixth step (symbolized by the arrow referenced 6 in FIG. 6), the target server A sends the authentication server B the universal unique identifier for the client terminal C (Client UUID) as well as information for identification of the user of the client terminal C (for example name, forename, email address, IP address (Client IP), etc.). This transmission is understood by the authentication server B as a request for a password for the client terminal C.

In a seventh step (symbolized by the arrow referenced 7 in FIG. 7), the authentication server B makes several verifications:
  it verifies whether or not the target server A is registered for the authentication service;
  it verifies whether or not the client terminal C is registered for the authentication service (to this end, it uses the identification information concerning the user of the client terminal C, provided by the target server A, and compares this information with the identification information at its disposal for the users registered for the authentication service);
  it verifies whether or not the client terminal C is connected to the authentication service (to this end it uses the IP address of the client terminal C provided by the target server A, and compares it with the IP addresses of the client terminals connected to the authentication service).

If these verifications are positive, the authentication server B carries out the following steps (before passing to the eighth step of the method):
  generates a one-time password (OTP) having a short and predetermined duration of validity;
  sends the target server A a verification status as well as the OTP generated; and
  registers the universal unique identifier of the client terminal C (Client UUID).

If at least one of these verifications is negative, the present method of authentication by triangulation stops. The authentication server B sends the target server A either a message requesting the target server A to propose to the client terminal C that it should pass to a classic method of authentication of the client terminal C (with entry of a login and a password) or an error page, as a function of the implementation chosen by the editor of the authentication server B.

In an eighth step (symbolized by the arrow referenced 8 in FIG. 8), the target server A registers the OTP for a limited duration and re-transmits, to the client terminal C, the universal unique identifier of this client (Client UUID). Then, the invention passes to the ninth step of the method.

In the event of at least one negative verification at the seventh step, the eighth step is replaced by a step in which the target server A sends back the client terminal C either a page asking it to create an account (in order to go to a classic method of authentication with entry of a login and a password) or an error page, depending on the implementation chosen by the editor of the target server A.

In a ninth step (symbolized by the arrow referenced 9 in FIG. 9), the client terminal C registers the universal unique identifier (Client UUID) transmitted by the target server A and transmits, to the authentication server B, a request to obtain a password. The request contains the pieces of information "Partner URL", "Partner IP" and "Client UUID" defined further above.

In a tenth step (symbolized by the arrow referenced 10 in FIG. 10), the authentication server B carries out several verifications:

- it verifies whether or not the client terminal C has sent a request in order to obtain a password during a specific period of time during the same HTTPS session;
- it verifies whether the universal unique identifier (Client UUID) given by the client terminal C corresponds to the one given by the target server A; and
- it verifies whether the domain of the target server A corresponds to the domain contained in the request transmitted by the client terminal C (through the "Partner URL" and "Partner IP").

If these verifications are positive, the authentication server B transmits the OTP to the client terminal C. Then the method passes on to its eleventh step.

If at least one of these verifications is negative, the present method of authentication by triangulation stops. The authentication server B sends the client terminal C either a message requesting it to go to a classic method of authentication with the target server A (with entry of a login and a password), or an error page depending on the implementation chosen by the editor of the authentication server B.

In an eleventh step (symbolized by the arrow referenced 11 in FIG. 11), the client terminal C gets connected to the target server A with its identifier (login 2) and the OTP given by the authentication server B with a view to setting up a secure connection between them (HTTPS secured link, SSL, etc.).

In a twelfth step (symbolized by the arrow referenced 12 in FIG. 12), the target server A carries out several verifications:

- it verifies whether or not the client terminal C has been connected during said specified period of time in the course of the same HTTPS session;
- it verifies whether or not the OTP given by the client terminal C corresponds to the one provided by the authentication server C at the step of FIG. 7 and stored at the step of FIG. 8.

If these verifications are positive, the target server A sends a connection status to the client terminal C. The client terminal C is considered to be authenticated with the target server A (and the target server A can therefore accept a secure connection from the client terminal C). The target server A has delegated its authentication of the client terminal C to the authentication server B.

If at least one of the verifications is negative, the present method of authentication by triangulation stops. The target server A sends the client terminal C either a message requesting it to pass to a classic method of authentication (with entry of a login and a password) or an error page depending on the implementation chosen by the editor of the target server A.

In a thirteenth step (symbolized by the arrow referenced 13 in FIG. 12), the client terminal C asks the target server A for a protected content (resource).

In a fourteenth step (symbolized by the arrow referenced 14 in FIG. 12), the target server A transmits the protected content to the client terminal C.

In a fifteenth step (symbolized by the arrow referenced 15 in FIG. 12), the client terminal C logs out from the target server A. If the client terminal C does not transmit any other request for content to the target server A, or else if said specified period of time (during the same HTTPS session) has elapsed, the connection to the authentication server B is lost.

The proposed solution, especially in the example described here above, enables in particular the application of the principle of a unique authentication, for example from a computer, a tablet or a smartphone to target servers unsuited to prior art SSO-type systems (requiring an affiliation and the use of signed authentication tokens).

Examples of application with target servers unsuited to known SSO type systems:

- the retrieval of protected data on distinct target servers, such as for example bank statements distributed among the servers of different banks;
- application with an authentication server embedded in a gateway (of the box type), the access to a set of connected sensors (each integrating a target server) of a site (a residential or professional or even industrial site) if the box-type gateway is of a server type;
- application within a residential space or a company, access by a user to all the internal target servers.

FIG. 13 presents an example of a structure 130 to implement each of the three entities (client terminal C, target server A and authentication server B) involved in the method of authentication of FIGS. 1 to 12.

This structure comprises a random-access memory 132 (for example a RAM), a read-only memory 133 (for example a ROM or a hard disk drive) and a processing unit 131 (equipped for example with a processor and managed by a computer program 1330 stored in the read-only memory 133). At initialization, the code instructions of the computer program 1330 are for example loaded into the read-only memory 132 and then executed by the processor of the processing unit 131.

This FIG. 13 illustrates only one particular way, among several possible ways, of implementing the client terminal C, the target server A and the authentication server B. Indeed, each of these three entities can be implemented equally well on a reprogrammable computing machine (a PC computer, a DSP processor or a microcontroller) executing a program comprising a sequence of instructions or on a dedicated computation machine (for example a set of logic gates such as an FPGA or an ASIC or any other hardware module).

In the case of implementation on a reprogrammable computation machine, the corresponding program (i.e. the sequence of instructions) could be stored in a storage medium that is detachable (such as for example a floppy disk, a CD-ROM or a DVD-ROM) or non-detachable, this storage medium being partially or totally readable by a computer or a processor.

Several variants of the example described here above with reference to FIGS. 1 to 12 can be envisaged. In particular it is possible to provide for different timelines or chronologies for the steps.

For example, in one variant, it is the target server A that generates the password (for the client terminal C) and transmits it to the authentication server B (which itself transmits it to the client terminal C).

More specifically, in this variant, the fourth, sixth and seventh steps presented further above (symbolized by the arrows referenced 4, 6 and 7 in FIGS. 4, 6 and 7), are replaced by fourth, sixth and seventh modified steps (symbolized by the arrows referenced 4', 6' and 7' in FIGS. 4, 6 and 7).

The fourth modified step (4') is distinguished from the fourth step presented further above (4) in that, in the event of positive verification (i.e. if the client terminal is properly registered), the target server A additionally carries out the following step (before the passage to the fifth step of the method): it generates an OTP password.

The sixth modified step (6') is distinguished from the sixth step presented further above (6) in that the target server A additionally carries out the following step: it transmits the OTP password to the authentication server B.

The seventh modified step (7') is distinguished from the seventh step presented further above (7) in that, if the verifications are positive, the authentication server B no longer carries out the step for generating an OTP.

The invention claimed is:

1. A method of authentication of a client terminal by a target server, wherein the method comprises the following acts:
   the client terminal authenticates itself with an authentication server;
   the target server authenticates itself with the authentication server;
   the authentication server and the target server share a first password for the client terminal, wherein one of the authentication server or the target server transmits the first password to the other of the authentication server or the target server;
   upon request of the client terminal, the authentication server transmits the first password to the client terminal;
   the client terminal transmits the first password transmitted by the authentication server to the target server; and
   upon receiving a password from the client terminal, the target server determines whether or not there is a correspondence between the first password shared with the authentication server and the password received from the client terminal, and if said correspondence between the received password and the first password exists, the client terminal is authenticated by the target server.

2. The method according to claim 1, wherein the method further comprises the following acts:
   the target server asks the authentication server for said first password, for the client terminal; and
   the authentication server generates said first password.

3. The method according to claim 2, wherein the act in which the target server asks the authentication server for said first password comes after the following act:
   the client terminal identifies itself with the target server without authenticating itself.

4. The method according to claim 1, wherein the method comprises the following acts:
   the target server generates said first password for the client terminal; and
   the target server transmits said first password to the authentication server.

5. The method according to claim 1, wherein the method comprises the following acts:
   the target server generates a universal unique identifier for the client terminal and transmits said universal unique identifier to the authentication server;
   the authentication server transmits said universal unique identifier to the client terminal;
   the client terminal sends a request to the authentication server to obtain said first password, said request containing said universal unique identifier; and
   the authentication server verifies whether or not there is a correspondence between the universal unique identifier transmitted by the client terminal and the universal unique identifier transmitted by the target server;
   and wherein the act of transmission of the first password from the authentication server to the client terminal is not executed if the correspondence between universal unique identifiers does not exist.

6. The method according to claim 1, wherein the method comprises the following act:
   the authentication server retrieves and registers an IP address of the client terminal;
   the target server retrieves and registers the IP address of the client terminal;
   the target server sends the IP address of the client terminal to the authentication server;
   the authentication server compares the IP address of the client terminal coming from the target server and the pre-registered IP address of the client terminal, and verifies whether or not there is a correspondence;
   and wherein the act of transmission of the first password from the authentication server to the target server is not executed if said correspondence between the IP addresses of the client terminal does not exist.

7. The method according to claim 1, wherein the method comprises the following acts:
   the authentication server retrieves and registers at least one piece of information for identification of the target server;
   the client terminal retrieves and registers said at least one piece of information for identification of the target server;
   the client terminal sends a request to the authentication server to obtain said first password, said request containing said at least one piece of information for identification of the target server;
   the authentication server verifies whether or not there is a correspondence between said at least one piece of information for identification of the target server transmitted by the client terminal and said at least one piece of pre-registered information for identification of the target server;
   and wherein the act of transmission of the first password from the authentication server to the client terminal is not executed if said correspondence between pieces of information for identification of the target server does not exist.

8. The method according to claim 7, wherein said at least one piece of information for identification of the target server belongs to the group consisting of an IP address of the target server and a URL address of the target server.

9. The method according to claim 1, wherein the method comprises the following act:
   the target server obtains at least one piece of information for identification of at least one user of said client terminal;
   the target server sends a request to the authentication server to obtain said first password, said request containing said at least one piece of identification information;
   the authentication server verifies, as a function of said at least one piece of identification information transmitted by the target server, whether or not the client terminal is registered with the authentication server;

and wherein an act of transmission of the first password from the authentication server to the target server is not executed if the client terminal is not registered with the authentication server.

10. The method according to claim 1, wherein said first password is a one-time password and has a first duration of validity.

11. A plurality of non-transitory computer-readable and non-transient storage mediums, storing code instructions, which when executed by at least one processor of a client terminal, a target server and an authentication server, configure the client terminal, target server and authentication server to perform acts comprising:
the authentication server and the target server share a first password for the client terminal, wherein one of the authentication server or the target server transmits the first password to the other of the authentication server or the target server;
upon request of the client terminal, the authentication server transmits the first password to the client terminal;
the client terminal transmits the first password transmitted by the authentication server to the target server; and
upon receiving a password from the client terminal, the target server determines whether or not there is a correspondence between the first password shared with the authentication server and the password received from the client terminal, and if said correspondence between the received password and the first password exists, the client terminal is authenticated by the target server.

12. A system comprising:
a client terminal comprising a first processor and a first non-transitory computer-readable medium comprising first instructions stored thereon, which when executed by the first processor configure the client terminal to authenticate itself with an authentication server;
a target server comprising a second processor and a second non-transitory computer-readable medium comprising second instructions stored thereon, which when executed by the second processor configure the target server to authenticate itself with the authentication server, wherein the authentication server and the target server share a first password for the client terminal, wherein one of the authentication server or the target server are configured to transmit the first password to the other of the authentication server or the target server;
the authentication server, which comprises a third processor and a third non-transitory computer-readable medium comprising third instructions stored thereon, which when executed by the third processor configure the authentication server to transmit the first password to the client terminal upon request of the client terminal;
the client terminal further being configured to transmit the first password transmitted by the authentication server to the target server; and
the target server further being configured to determine, upon receiving a password from the client terminal, whether or not there is a correspondence between the first password shared with the authentication server and the password received from the client terminal, the client terminal being authenticated by the target server if said correspondence between the received password and the first passwords exists.

13. The system according to claim 12, wherein:
the target server is further configured to ask the authentication server for said first password, for the client terminal; and
the authentication server is further configured to generate said first password.

14. The system according to claim 13, wherein the client terminal is further configured to identify itself with the target server without authenticating itself.

15. The system according to claim 12, wherein:
the target server is further configured to generate said first password for the client terminal; and
the target server is further configured to transmit said first password to the authentication server.

16. The system according to claim 12, wherein:
the target server is further configured to generate a universal unique identifier for the client terminal and transmits said universal unique identifier to the authentication server;
the authentication server is further configured to transmit said universal unique identifier to the client terminal;
the client terminal is further configured to send a request to the authentication server to obtain said first password, said request containing said universal unique identifier; and
the authentication server is further configured to verify whether or not there is a correspondence between the universal unique identifier transmitted by the client terminal and the universal unique identifier transmitted by the target server;
and wherein transmission of the first password from the authentication server to the client terminal is not executed if the correspondence between universal unique identifiers does not exist.

17. The system according to claim 12, wherein:
the authentication server is further configured to retrieve and register an IP address of the client terminal;
the target server is further configured to generate retrieve and register the IP address of the client terminal;
the target server is further configured to send the IP address of the client terminal to the authentication server;
the authentication server is further configured to compare the IP address of the client terminal coming from the target server and the pre-registered IP address of the client terminal, and to verify whether or not there is a correspondence;
and wherein transmission of the first password from the authentication server to the target server is not executed if said correspondence between the IP addresses of the client terminal does not exist.

18. The system according to claim 12, wherein:
the authentication server is further configured to retrieve and register at least one piece of information for identification of the target server;
the client terminal is further configured to retrieve and register said at least one piece of information for identification of the target server;
the client terminal is further configured to send a request to the authentication server to obtain said first password, said request containing said at least one piece of information for identification of the target server;
the authentication server is further configured to verify whether or not there is a correspondence between said at least one piece of information for identification of the target server transmitted by the client terminal and said at least one piece of pre-registered information for identification of the target server;

and wherein transmission of the first password from the authentication server to the client terminal is not executed if said correspondence between pieces of information for identification of the target server does not exist.

19. The system according to claim 18, wherein said at least one piece of information for identification of the target server belongs to the group consisting of an IP address of the target server and a URL address of the target server.

20. The system according to claim 12, wherein:
the target server is further configured to obtain at least one piece of information for identification of at least one user of said client terminal;
the target server is further configured to send a request to the authentication server to obtain said first password, said request containing said at least one piece of identification information;
the authentication server is further configured to verify, as a function of said at least one piece of identification information transmitted by the target server, whether or not the client terminal is registered with the authentication server;
and wherein transmission of the first password from the authentication server to the target server is not executed if the client terminal is not registered with the authentication server.

* * * * *